(12) United States Patent
Iwanaga et al.

(10) Patent No.: US 9,243,145 B2
(45) Date of Patent: Jan. 26, 2016

(54) SILICA COMPOSITE PARTICLES AND METHOD OF PREPARING THE SAME

(71) Applicant: FUJI XEROX CO., LTD., Tokyo (JP)

(72) Inventors: Takeshi Iwanaga, Kanagawa (JP); Yuka Zenitani, Kanagawa (JP); Yasunobu Kashima, Kanagawa (JP); Chika Hama, Kanagawa (JP); Yoshifumi Iida, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 13/934,928

(22) Filed: Jul. 3, 2013

(65) Prior Publication Data
US 2014/0212667 A1   Jul. 31, 2014

(30) Foreign Application Priority Data

Jan. 28, 2013 (JP) ................................ 2013-013268

(51) Int. Cl.
*B32B 5/16* (2006.01)
*C07F 7/08* (2006.01)
*C09C 1/30* (2006.01)

(52) U.S. Cl.
CPC .............. *C09C 1/309* (2013.01); *C09C 1/3054* (2013.01); *C09C 1/3063* (2013.01); *C09C 1/3081* (2013.01); *C01P 2004/51* (2013.01); *C01P 2004/62* (2013.01); *C01P 2004/64* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 4,775,520 A | 10/1988 | Unger et al. | |
| 4,849,390 A | 7/1989 | Sano et al. | |
| 4,902,598 A | 2/1990 | Winnik et al. | |
| 4,911,903 A | 3/1990 | Unger et al. | |
| 5,221,497 A | 6/1993 | Watanabe et al. | |
| 5,597,512 A | 1/1997 | Watanabe et al. | |
| 5,609,675 A | 3/1997 | Noritake et al. | |
| 5,674,589 A | 10/1997 | Bennett et al. | |
| 5,985,229 A | 11/1999 | Yamada et al. | |
| 5,998,329 A | 12/1999 | Derolf et al. | |
| 6,113,682 A | 9/2000 | Shin et al. | |
| 6,296,996 B1 | 10/2001 | Ogawa et al. | |
| 6,403,271 B1 | 6/2002 | Suzuki et al. | |
| 6,770,130 B2 | 8/2004 | Kato et al. | |
| 6,811,944 B2 | 11/2004 | Higuchi et al. | |
| 6,875,549 B2 | 4/2005 | Yamazaki et al. | |
| 7,846,632 B2 | 12/2010 | Nakatani | |
| 2004/0067189 A1 | 4/2004 | Sugiura et al. | |
| 2004/0137353 A1* | 7/2004 | Iida et al. | 430/108.24 |
| 2004/0222618 A1 | 11/2004 | Azechi et al. | |
| 2004/0229040 A1 | 11/2004 | Kudo et al. | |
| 2005/0260515 A1 | 11/2005 | Kato et al. | |
| 2007/0020543 A1 | 1/2007 | Nakatani | |
| 2007/0218387 A1 | 9/2007 | Ishii et al. | |
| 2008/0086951 A1 | 4/2008 | Wakamiya et al. | |
| 2008/0268362 A1 | 10/2008 | Kudo | |
| 2009/0196658 A1 | 8/2009 | Sugiura | |
| 2010/0104323 A1 | 4/2010 | Toizumi et al. | |
| 2010/0203443 A1 | 8/2010 | Okita et al. | |
| 2010/0330488 A1 | 12/2010 | Ieda | |
| 2011/0209413 A1 | 9/2011 | Nishida et al. | |
| 2011/0318581 A1 | 12/2011 | Zenitani et al. | |
| 2011/0318584 A1* | 12/2011 | Yoshikawa et al. | 428/404 |
| 2011/0319647 A1 | 12/2011 | Yoshikawa et al. | |

FOREIGN PATENT DOCUMENTS

| | | |
|---|---|---|
| CN | 86106689 A | 5/1987 |
| CN | 1202710 A | 12/1998 |
| CN | 1380585 A | 11/2002 |
| CN | 101271287 A | 9/2008 |
| CN | 101807019 A | 8/2010 |
| CN | 102295292 A | 12/2011 |
| EP | 0 574 642 A1 | 12/1993 |
| JP | A-62-52119 | 3/1987 |
| JP | A-63-310714 | 12/1988 |
| JP | A-1-317115 | 12/1989 |
| JP | A 1-317115 | 12/1989 |
| JP | A-4-187512 | 7/1992 |
| JP | A-4-238807 | 8/1992 |
| JP | A-04-255755 | 9/1992 |
| JP | A-5-4812 | 1/1993 |

(Continued)

OTHER PUBLICATIONS

Machine translation JP 2002-029730. (2002).*

(Continued)

*Primary Examiner* — Alexandre Ferre
(74) *Attorney, Agent, or Firm* — Oliff PLC

(57) ABSTRACT

Silica composite particles in which a silica particle surface is sequentially surface-treated with a titanium compound in which an organic group is bonded to a titanium atom through an oxygen atom, and a hydrophobizing agent are provided, in which a titanium content in the silica composite particles measured using fluorescence X-ray is from 0.001% by weight to 10% by weight; a titanium content of a surface layer of the silica composite particles satisfies the following Formula (1); an average particle diameter of the silica composite particles is from 30 nm to 500 nm; and a particle size distribution index of the silica composite particles is from 1.1 to 1.5:

$$0.6 < Y/X < 1.8 \quad (1)$$

wherein X represents a titanium content in silica composite particles measured using fluorescence X-ray, and Y represents a titanium content of the silica composite particle surface obtained by XPS measurement.

20 Claims, No Drawings

(56) References Cited

FOREIGN PATENT DOCUMENTS

| | | |
|---|---|---|
| JP | A-06-041419 | 2/1994 |
| JP | A-6-254383 | 9/1994 |
| JP | A-7-118008 | 5/1995 |
| JP | A 7-118008 | 5/1995 |
| JP | A-7-277725 | 10/1995 |
| JP | A-8-12305 | 1/1996 |
| JP | A-08-283617 | 10/1996 |
| JP | A-09-143401 | 6/1997 |
| JP | A-9-202612 | 8/1997 |
| JP | A-11-60232 | 3/1999 |
| JP | A 11-060232 | 3/1999 |
| JP | A-11-286611 | 10/1999 |
| JP | 2000344512 A * | 12/2000 |
| JP | A-2000-344512 | 12/2000 |
| JP | A-2001-150334 | 6/2001 |
| JP | 2001189009 A * | 7/2001 |
| JP | A-2001-189009 | 7/2001 |
| JP | 2002029730 A * | 1/2002 |
| JP | A 2002-038049 | 2/2002 |
| JP | A-2002-38049 | 2/2002 |
| JP | A-2002-146233 | 5/2002 |
| JP | A-2003-133267 | 5/2003 |
| JP | A 2003-133267 | 5/2003 |
| JP | A-2003-165718 | 6/2003 |
| JP | A-2003-171117 | 6/2003 |
| JP | A 2004-035293 | 2/2004 |
| JP | A-2004-35293 | 2/2004 |
| JP | A-2004-102236 | 4/2004 |
| JP | A 2004-203638 | 7/2004 |
| JP | A-2004-203638 | 7/2004 |
| JP | A-2004-338969 | 12/2004 |
| JP | A-2005-84295 | 3/2005 |
| JP | A-2006-028319 | 2/2006 |
| JP | A-2006-251220 | 9/2006 |
| JP | A-2007-22827 | 2/2007 |
| JP | A 2008-169102 | 7/2008 |
| JP | A-2008-169102 | 7/2008 |
| JP | A-2008-174430 | 7/2008 |
| JP | A-2008-285406 | 11/2008 |
| JP | A-2009-78935 | 4/2009 |
| JP | A 2009-078935 | 4/2009 |
| JP | A 2009-137791 | 6/2009 |
| JP | A-2009-137791 | 6/2009 |
| JP | A 2009-149493 | 7/2009 |
| JP | A-2009-149493 | 7/2009 |
| JP | A 2009-161371 | 7/2009 |
| JP | A-2009-161371 | 7/2009 |
| JP | A-2009-186512 | 8/2009 |
| JP | A-2010-107601 | 5/2010 |
| JP | A-2011-185998 | 9/2011 |
| JP | A-2012-6781 | 1/2012 |
| JP | A-2012-6789 | 1/2012 |
| WO | WO 2008/018966 A2 | 2/2008 |
| WO | WO 2010/052945 A1 | 5/2010 |

OTHER PUBLICATIONS

Machine Translation JP 2001189009 (2001).*
Machine Translation JP 2000344512 (2000).*
Apr. 12, 2012 Extended European Search Report issued in European Patent Application No. 11185668.8.
Aug. 16, 2013 Office Action issued in U.S. Appl. No. 13/214,816.
Dec. 19, 2013 Office Action issued in Chinese Application No. 201010546805.8 (with English Translation).
Jan. 30, 2014 Office Action issued in U.S. Appl. No. 13/214,657.
Jan. 30, 2014 Office Action issued in U.S. Appl. No. 13/214,816.
Jul. 19, 2013 Office Action issued in U.S. Appl. No. 13/214,657.
Jul. 22, 2013 Office Action issued in Australian Patent Application No. 2012258292.
Kim et al., "Influence of reaction conditions on sol-precipitation process producing silicon oxide particles," Ceramics International, vol. 28 (2002), pp. 187-194.
Mar. 14, 2013 Office Action issued in U.S. Appl. No. 12/912,057.
Mar. 20, 2013 Office Action issued in U.S. Appl. No. 12/917,814.
Nagao et al., "Particle formation in the hydrolysis of tetraethyl orthosilicate in pH buffer solution," Journal of Colloid and Interface Science, vol. 279 (2004), pp. 143-149.
Oct. 15, 2013 Office Action issued in Japanese Application No. 2010-143828 (with English Translation).
Oct. 23, 2012 Office Action issued in U.S. Appl. No. 12/912,057.
Oct. 29, 2013 Office Action issued in Japanese Patent Application No. 2010-145221 (with English Translation).
Sep. 10, 2012 Australian Office Action issued in Australian Patent Application No. 2011232772.
Sep. 17, 2012 Office Action issued in U.S. Appl. No. 12/917,814.
U.S. Appl. No. 12/912,057 in the name of Zenatani et al., filed Oct. 26, 2010.
U.S. Appl. No. 12/917,814 in the name of Yoshikawa et al., filed Nov. 2, 2010.
U.S. Appl. No. 13/214,657 in the name of Zenitani et al., filed Aug. 22, 2011.
U.S. Appl. No. 13/214,816 in the name of Yoshikawa et al., filed Aug. 22, 2011.
Wang et al., "Preparation of spherical silica particles by Stöber process with high concentration of tetra-ethyl-orthosilicate," Journal of Colloid and Interface Science, vol. 341, pp. 23-29, available online Sep. 18, 2009.
U.S Appl. No. 13/670,040 in the name of Iwanaga et al., filed Nov. 6, 2012.
May 7, 2014 Office Action issued in U.S. Appl. No. 12/917,814.
May 23, 2014 Notice of Allowance issued in U.S. Appl. No. 12/912,057.
Mar. 21, 2014 Office Action issued in U.S. Appl. No. 13/670,040.
Aug. 11, 2014 Notice of Information Offer issued in Japanese Patent Application No. 2011-010052 w/translation.
Dec. 5, 2014 Office Action issued in U.S. Appl. No. 12/917,814.
Feb. 10, 2015 Office Action issued in Chinese Application No. 201110318210.1.
Feb. 2, 2015 Office Action issued in Chinese Application No. 201110318138.2.
Aug. 20, 2014 Office Action issued in Chinese Application No. 201010546805.8 (with English Translation).
Aug. 28, 2014 Office Action issued in U.S. Appl. No. 13/670,040.
Other Document 1: Table to confirm that the oxide particles described in [Table 1] of [0265] of Publication 1 satisfy the formula (1) of Claim I of the present application (with English Translation), (2015).
Jul. 7, 2014 Information Offer Form issued in Japanese Application No. 2011-008842 (with English Translation).

* cited by examiner

SILICA COMPOSITE PARTICLES AND METHOD OF PREPARING THE SAME

CROSS-REFERENCE TO RELATED APPLICATIONS

This application is based on and claims priority under 35 USC 119 from Japanese Patent Application No. 2013-013268 filed Jan. 28, 2013.

BACKGROUND

1. Technical Field

The present invention relates to silica composite particles and a method of preparing the same.

2. Related Art

Silica particles are used as additives or main ingredients of toners, cosmetics, rubbers, abrasives and the like, and have a role of, for example, improving the strength of resins, improving the fluidity of powders, or suppressing packing. Since it is considered that the properties of the silica particles are likely to depend on the shape of the silica particles, silica particles having various shapes have been proposed.

SUMMARY

According to an aspect of the invention, there is provided silica composite particles in which a silica particle surface is sequentially surface-treated with a titanium compound in which an organic group is bonded to a titanium atom through an oxygen atom, and a hydrophobizing agent, in which a titanium content in the silica composite particles measured using fluorescence X-ray is from 0.001% by weight to 10% by weight, a titanium content of a surface layer of the silica composite particles satisfies the following Formula (1), an average particle diameter of the silica composite particles is from 30 nm to 500 nm, and a particle size distribution index of the silica composite particles is from 1.1 to 1.5:

$$0.6 < Y/X < 1.8 \qquad (1)$$

wherein in Formula (1), X represents a titanium content (% by weight) in silica composite particles measured using fluorescence X-ray, and Y represents a titanium content (atom %) of the silica composite particle surface obtained by XPS measurement.

DETAILED DESCRIPTION

Hereinafter, an exemplary embodiment illustrating an example of the invention will be described in detail.

Silica Composite Particles

The silica composite particles according to the exemplary embodiment are silica composite particles in which a silica particle surface is sequentially surface-treated with (1) a titanium compound and in which an organic group is bonded to a titanium atom through an oxygen atom and (2) a hydrophobizing agent.

A titanium content in the silica composite particles measured using fluorescence X-ray is from 0.001% by weight to 10% by weight, and a titanium content of a surface layer of the silica composite particles satisfy the following Formula (1), in which the silica composite particles have an average particle diameter of from 30 nm to 500 nm, and a particle size distribution index of from 1.1 to 1.5.

$$0.6 < Y/X < 1.8 \qquad (1)$$

In Formula (1), X represents a titanium content (% by weight) in silica composite particles measured using fluorescence X-ray, Y represents a titanium content (atom %) of the silica composite particle surface obtained by XPS measurement.

Due to the aforementioned configuration, the silica composite particles according to the exemplary embodiment improve the dispersibility into a target to be attached (for example, resin particles, iron powder and other powder) and the maintenance of fluidity of the target to be attached even if the environment fluctuates.

The reason for this is not clear, but is considered to be as follows.

The silica composite particles having the volume average particle diameter and particle size distribution index are the particles having the characteristics that the size range thereof is appropriate and the particle size distribution thereof is uniform.

Since such silica composite particles are in an appropriate range and have uniform particle size distribution, the adhesion among the particles is considered to be lower and thus less likely to cause friction among the particles, as compared with particles having a broader particle size distribution. As a result, it is considered that the silica composite particles by itself are excellent in fluidity.

In addition, since the silica composite particles are in an appropriate range and satisfy the above Formula (1), a lot of the titanium having higher affinity than the silica, with respect to the target to be attached, is present on the surface, as compared with the center portion. It is considered that, when attaching to the target to be attached, it is less likely to cause embedding to the target to be detached therefrom.

Therefore, it is considered that the silica composite particles according to the exemplary embodiment improve the dispersibility into a target to be attached and the maintenance of fluidity of a target to be attached.

In addition, since the silica composite particles of the exemplary embodiment contain titanium in an appropriate range, hygroscopicity decreases, as compared with the silica particles including only silicon oxide, that is, when the environment has fluctuated (for example, environmental fluctuation between the environment of high temperature and high humidity represented by the summer environment and the environment of low temperature and low humidity represented by the winter environment), the fluctuation of the amount of water retention decreases, and it is considered that the fluctuations of the characteristics (such as fluidity of the silica composite particles by itself) are suppressed.

From the above, it is considered that the silica composite particles according the exemplary embodiment improve the dispersibility into a target to be attached and the maintenance of fluidity of a target to be attached even if the environment fluctuates.

Specifically, it is considered that that since the silica composite particles according to the exemplary embodiment have an irregular shape having an average degree of circularity of from 0.5 to 0.85, in a case of being attached to a target to be attached, occurrence of embedding into the target to be attached or uneven distribution or detaching caused by rolling is suppressed, and occurrence of destruction caused by a mechanical load is suppressed, as compared with a case where particles have a spherical shape (a shape having an average degree of circularity of greater than 0.85). Therefore, it is considered that the dispersibility into a target to be attached and the maintenance of fluidity of a target to be attached become easier to improve.

Hereinafter, the silica composite particles according to the exemplary embodiment will be described in detail.

The silica composite particles according to the exemplary embodiment are composite particles in which the surface of the particles included silicon oxide (silicon dioxide: silica) is surface-treated with organic titanium compound and hydrophobizing agent, that is, the composition particles which has a large amount of titanium on the surface layer than the center portion of the silica particles.

Specifically, the titanium content in the silica composite particles measured using fluorescence X-ray is from 0.001% by weight to 10% by weight, and the titanium content of the surface layer of the silica composite particles satisfies the following Formula (1).

$$0.6 < Y/X < 1.8 \tag{1}$$

In Formula (1), X represents a titanium content (% by weight) in silica composite particles measured using fluorescence X-ray. Y represents a titanium content (atom %) of the silica composite particle surface obtained by XPS measurement.

Here, the titanium content in the silica composite particles measured using fluorescence X-ray is preferably from 0.001% by weight to 5% by weight, and more preferably from 0.1% by weight to 3% by weight.

When the content of titanium is less than the above range, the fluctuations of the characteristics of the silica composite particles caused by the environmental fluctuations occur.

On the other hand, when the content of titanium exceeds the above range, in a case of preparing the silica composite particles, this causes the vigorous reaction of a titanium compound (particularly, tetraalkoxytitanium), which leads to excess occurrence of coarse powder or the deterioration of particle size distribution and of the shape, thereby the desired particle size is unable to be obtained. In particular, in a case where a mechanical load is applied to the silica composite particles, the particles tend to have defects, and it is difficult to have an improvement in fluidity maintenance.

The titanium content in the silica composite particles measured using fluorescence X-ray is obtained by measuring NET strength of constitutional elements in the particles, using a fluorescence X-ray analyzer: XRF 1500 (manufactured by Shimadzu Corporation), and the titanium content is quantified and measured from calibration curves of the above NET strength and the NET strength at titanium content of 0% and 100%.

The titanium content of the silica composite particle surface obtained by XPS measurement is calculated by a X-ray photoelectron spectrometer. Specifically, the titanium content is calculated from intensity of the peak of each element measured using JPS9000MX (manufactured by JEOL Ltd.) as a measurement device, in MgK$\alpha$ rays, under conditions of 10 kV, 20 mmA.

Average Particle Diameter

The silica composite particles according to the exemplary embodiment have an average particle diameter of from 30 nm to 500 nm (preferably from 60 nm to 500 nm, more preferably from 100 nm to 350 nm, and still more preferably from 100 nm to 250 nm).

In addition, the average particle diameter is the average particle diameter of the primary particles of the silica composite particles.

When the average particle diameter of the silica composite particles is less than 30 nm, the shape of the silica composite particles tends to be spherical, and it is difficult to have a shape having an average degree of circularity of the silica composite particles from 0.50 to 0.85. In addition, even if the particles have an irregular shape, this makes it difficult to suppress the embedding of the silica composite particles into a target to be attached, and makes it difficult to realize the maintenance of fluidity of a target to be attached.

On the other hand, when the average particle diameter of the silica composite particles exceeds 500 nm, in a case where a mechanical load is applied to the silica composite particles, the particles tend to have defects, which makes it difficult to realize the maintenance of fluidity of a target to be attached.

In regard to measuring the average particle diameter of the silica composite particles, the silica composite particles are dispersed into resin particles having a particle size of 100 μm (polyester, weight average molecular weight Mw=50000), and then 100 primary particles of the dispersed silica composite particles are observed with an SEM (Scanning Electron Microscope) apparatus. The average particle diameter means a 50% diameter (D50v) in the cumulative frequency of the circle-equivalent diameter obtained by an image analysis for the primary particles.

Particle Size Distribution Index

The silica composite particles according to the exemplary embodiment have a particle size distribution index of from 1.1 to 1.5, and preferably from 1.25 to 1.40.

In addition, the particle size distribution index is the particle size distribution index of the primary particles of silica composite particles.

The silica particles in which the particle size distribution index of the silica composite particles is less than 1.1 are difficult to be prepared.

On the other hand, when the particle size distribution of the silica composite particles exceeds 1.5, coarse particles occur, or the dispersibility into a target to be attached deteriorates due to variations in particle size. In addition, with the increase of the presence of the coarse particles, number of defects in the particles increases due to mechanical loads thereof, thereby making it difficult to realize the fluidity maintenance of a target to be attached.

In regard to measuring a particle size distribution index of the silica composite particles, the silica composite particles are dispersed into resin particles having a particle size of 100 μm (polyester, weight average molecular weight Mw=50000), and then 100 primary particles of the dispersed silica composite particles are observed with an SEM apparatus. The particle size distribution index means the square root of the value obtained by dividing an 84% diameter by a 16% diameter in the cumulative frequency of the circle-equivalent diameter obtained by an image analysis for the primary particles.

Average Degree of Circularity

The silica composite particles according to the exemplary embodiment, for example, preferably have an average degree of circularity of from 0.5 to 0.85, more preferably from 0.6 to 0.8.

In addition, the average degree of circularity is the average degree of circularity of the primary particles of the silica composite particles.

When the average degree of circularity of the silica composite particles is less than 0.50, the particles have a spherical shape with a large vertical/horizontal ratio of the silica composite particles. As a result, in a case where a mechanical load is applied to the composite silica particles, stress concentration occurs, thereby the particles tend to have defects, which makes it difficult to realize the maintenance of fluidity of a target to be attached.

On the other hand, when the average degree of circularity of the silica composite particles exceeds 0.85, the silica composite particles approach a spherical shape. Therefore, in a case of mixing with a target to be attached, due to the mechanical loads such as stirring, the silica composite particles may be unevenly attached, or after being stored over time, the silica composite particles may be unevenly attached, and thus the dispersibility into the target to be attached deteriorates, and additionally, the silica composite particles tend to be detached from the target to be attached.

In relation to the degree of circularity "100/SF2" of the silica composite particles, the silica composite particles are dispersed into resin particles having a particle size of 100 μm (polyester, weight average molecular weight Mw=50000), and then primary particles of the dispersed silica particles are observed with an SEM apparatus. The degree of circularity is calculated by the following Formula (2) from an image analysis for the obtained primary particles.

$$\text{Degree of Circularity}(100/SF2) = 4\pi \times (A/I^2) \quad (2)$$

In Formula (2), I represents a peripheral length of the primary particles shown on the images, and A represents a projected area of the primary particles.

In addition, the degree of circularity of the silica composite particles is obtained as a 50% degree of circularity in the cumulative frequency of the circle-equivalent diameters of 100 primary particles obtained by the image analysis.

Method of Preparing Silica Composite Particles

The method of preparing the silica composite particles according to the exemplary embodiment is the preparation method for obtaining the silica composite particles according to the exemplary embodiment described above, and is specifically as follows.

The method of preparing the silica composite particles according to the exemplary embodiment is a method of preparing the silica composite particles including a step of preparing an alkali catalyst solution in which an alkali catalyst is contained in a solvent containing alcohol, a step of supplying a tetraalkoxysilane and an alkali catalyst into the alkali catalyst to form silica particles; a step of adding a mixed solution of alcohol and a titanium compound in which an organic group is bonded to a titanium atom through an oxygen atom, in the alkali catalyst solution in which the silica particles are formed, to perform a surface-treatment of the surface of the silica particles by the titanium compound; and a step of performing a surface-treatment of the surface of the silica particles treated by the titanium compound, with a hydrophobizing agent.

That is, the method of preparing silica composite particles according to the exemplary embodiment is a method of obtaining silica composite particles by supplying an alcohol diluted solution in which a titanium compound is diluted with alcohol into a solution of silica particles produced by sol-gel method, performing surface-treatment of surface of silica particles by the titanium compound, and then performing a surface-treatment of the surface of the silica particles treated by the titanium compound, with a hydrophobizing agent.

In the method of preparing the silica composite particles according to the exemplary embodiment, the silica composite particles according to the exemplary embodiment are obtained, by the technique described above. The reason for this is not clear, but is considered to be as follows. When performing surface-treatment by the titanium compound, by using the alcohol diluted solution in which a titanium compound is diluted with alcohol, instead of the titanium compound alone, the reaction rate of the titanium compound is lowered, and the polymerization reaction which biased the titanium compounds is suppressed, therefore, the silica composite particles having a desired particle diameter and particle size distribution are formed.

Here, in the preparing method of the silica composite particles according to the exemplary embodiment, the sol-gel method to form silica particles is not particularly limited, well-known methods are employed.

On the other hand, specifically, among the silica composite particles according to the present exemplary embodiment, in order to obtain irregular shaped silica composite particles, the following methods may be preferably employed.

A method of preparing the irregular shaped silica composite particles will be described, hereinafter, referred to as a "method of preparing silica composite particles according to the exemplary embodiment".

The method of preparing silica composite particles according to the exemplary embodiment is a method of preparing the irregular shaped silica composite particles including a step of preparing an alkali catalyst solution containing an alkali catalyst at a concentration of from 0.6 mol/L to 0.85 mol/L, in a solvent containing alcohol, a step of supplying, into the alkali catalyst solution, tetraalkoxysilane at a supply amount of from 0.001 mol/(mol·min) to 0.01 mol/(mol·min) relative to the alcohol, an alkali catalyst at a supply amount of from 0.1 mol to 0.4 mol, relative to per 1 mol of a total supply amount of the tetraalkoxysilane per one minute, to form silica particles, a step of supplying a mixed solution of alcohol and a titanium compound in which an organic group is bonded to a titanium atom through an oxygen atom, in the alkali catalyst solution in which the silica particles are formed, to perform a surface-treatment of the surface of the silica particles by the titanium compound, and a step of performing a surface-treatment of the surface of the silica particles treated by the titanium compound, with a hydrophobizing agent.

That is, in the method of preparing the silica composite particles according to the exemplary embodiment, the silica particles are formed by allowing tetraalkoxysilane to react, respectively, in the presence of alcohol containing an alkali catalyst at the concentration described above, while separately supplying tetraalkoxysilane as a raw material and an alkali catalyst as a catalyst in the amounts that satisfy the aforementioned relationship and then the silica composite particles are obtained by adding a mixed solution of alcohol and a titanium compound in the alkali catalyst solution in which the silica particles are formed, performing a surface-treatment of the surface of the silica particles by the titanium compound, and performing a surface-treatment of the surface of the silica particles treated by the titanium compound, with a hydrophobizing agent.

In the method of preparing the silica composite particles according to the exemplary embodiment, the occurrence of coarse aggregates is reduced and irregularly shaped silica composite particles are obtained, by the technique described above. The reason for this is not clear, but is considered to be as follows.

First, an alkali catalyst solution in which an alkali catalyst is contained in a solvent containing alcohol is prepared. When tetraalkoxysilane and an alkali catalyst are supplied into this solution, respectively, the tetraalkoxysilane supplied into the alkali catalyst solution are allowed to react, and nuclear particles are formed. At this time, when the concentration of the alkali catalyst in the alkali catalyst solution is within the range as defined above, it is considered that nuclear particles having an irregular shape may be formed while suppressing formation of coarse aggregates such as secondary aggregates. This is considered to be based on the following reason. In addition to catalytic action thereof, the alkali catalyst coordinates with the surface of the nuclear particles that are formed and contributes to the shape and dispersion stability of the nuclear particles. However, when the amount is in the range described above, the alkali catalyst does not uniformly cover the surface of the nuclear particle (that is, the alkali catalyst is unevenly distributed on the surface of the nuclear particles and adheres to the surface). Accordingly, even though the dispersion stability of the nuclear particles is maintained, partial bias in the surface tension, and chemical affinity of the nuclear particles occur, and thus irregular shaped nuclear particles are formed.

When the supplies of the tetraalkoxysilane and the alkali catalyst are respectively continued, the nuclear particles that are formed grow as a result of the reactions of the tetraalkoxysilane, and thereby the silica composite particles are obtained.

It is considered that when these supplies of tetraalkoxysilane and the alkali catalyst are carried out while the amounts of supply are set to be in the relationship described above, the irregular shaped nuclear particles grow into particles while maintaining the irregular shape, with the formation of coarse aggregates such as secondary aggregates being suppressed, and as a result, irregular shaped silica composite particles are formed. This is considered to be because, when these amounts of supply of the tetraalkoxysilane and the alkali catalyst are maintained in the relationship described above, the dispersion of the nuclear particles is maintained, while the partial bias in the tension and chemical affinity at the nuclear particle surface is maintained, and therefore, the nuclear particles grow into particles while maintaining the irregular shape.

Here, it is considered that the supply amount of the tetraalkoxysilane has effects on the particle size distribution or the degree of circularity of the silica composite particles. It is considered that, by controlling the supply amount of the tetraalkoxysilane to be from 0.001 mol/(mol·min) to 0.01 mol/(mol·min) relative to the alcohol, the contact probability of the tetraalkoxysilane added dropwise and the nuclear particles is reduced, and the tetraalkoxysilane is evenly supplied to the nuclear particles before the tetraalkoxysilane react with each other. Thus, it is considered that the reaction of the tetraalkoxysilane with the nuclear particles can evenly take place. As a result, it is considered that the variation in particle growth may be suppressed and the silica composite particles having a narrow distribution width may be prepared.

In addition, it is considered that the average particle diameter of the silica composite particles depends on the total supply amounts of the tetraalkoxysilane.

From the above, it is considered that in the method of preparing the silica composite particles according to the exemplary embodiment, the irregular shaped silica composite particles according to the exemplary embodiment described above may be obtained.

Furthermore, it is considered that in the method of preparing the silica composite particles according to the exemplary embodiment, irregular shaped nuclear particles are formed, and the nuclear particles are allowed to grow while maintaining this irregular shape, to thereby form the silica composite particles. Therefore, it is considered that irregular shaped silica composite particles having high shape-stability against a mechanical load, are obtained.

Furthermore, it is considered that in the method of preparing the silica composite particles according to the exemplary embodiment, the formed irregular shaped nuclear particles grow into particles while maintaining the irregular shape, and thus the silica composite particles are obtained. Therefore, it is considered that the silica composite particles that are strong against a mechanical load and are difficult to break, are obtained.

Furthermore, in the method of preparing the silica composite particles according to the exemplary embodiment, alkoxysilane and an alkali catalyst are respectively supplied into an alkali catalyst solution, and the reactions of alkoxysilane are induced, and thereby the formation of particles is achieved.

Therefore, the total amount of the alkali catalyst used is reduced as compared with the case of preparing irregular shaped silica composite particles by a sol-gel method in the related art, and as a result, the omission of a step for the removal of alkali catalyst is also realized. This is favorable in the case of applying the silica composite particles to a product where high purity is required.

First, an alkali catalyst solution preparing step will be described.

The alkali catalyst solution preparing step includes preparing a solvent containing alcohol, and adding an alkali catalyst to this solvent, thereby preparing an alkali catalyst solution.

The solvent containing alcohol may be formed only of alcohol, or may be a mixed solvent combined with other solvents, including water, ketones such as acetone, methyl ethyl ketone or methyl isobutyl ketone, cellosolves such as methyl cellosolve, ethyl cellosolve, butyl cellosolve or cellosolve acetate, ethers such as dioxane or tetrahydrofuran, and the like. In a case of the mixed solvent, the amount of alcohol to the other solvents is preferably 80% by weight or more, and more preferably 90% by weight or more.

Examples of the alcohol include lower alcohols, such as methanol or ethanol.

On the other hand, the alkali catalyst is a catalyst used for promoting the reactions of the tetraalkoxysilane (hydrolysis reaction or condensation reaction), and examples thereof include a basic catalyst such as ammonia, urea, monoamine or a quaternary ammonium salt, and ammonia is particularly preferable.

The concentration (content) of the alkali catalyst is from 0.6 mol/L to 0.85 mol/L, preferably from 0.63 mol/L to 0.78 mol/L, and more preferably from 0.66 mol/L to 0.75 mol/L.

When the concentration of the alkali catalyst is less than 0.6 mol/L, the dispersibility of the formed nuclear particles during the growth may become unstable. As a result, coarse aggregates such as secondary aggregates may be formed or a gel may be formed, and the particle size distribution may deteriorate in some cases.

On the other hand, when the concentration of the alkali catalyst is greater than 0.85 mol/L, stability of the formed nuclear particles may be excessively high. As a result, spherical nuclear particles may be formed and irregular shaped nuclear particles having an average degree of circularity of 0.85 or less may not be obtained. Accordingly, irregular shaped silica composite particles may not be obtained.

In addition, the concentration of the alkali catalyst is a concentration relative to the alcohol catalyst solution (alkali catalyst+solvent containing alcohol).

Next, a particle forming step will be described.

The particle forming step is a step of forming the silica particles by supplying tetraalkoxysilane and an alkali catalyst to an alkali catalyst solution, respectively, and allowing tetraalkoxysilane to react, respectively, in the alkali catalyst solution (hydrolysis reaction or condensation reaction).

In this particle forming step, the silica particles are formed by forming nuclear particles by the reactions of the tetraalkoxysilane at an early stage of supplying the tetraalkoxysilane (nuclear particles formation stage) and growing the nuclear particles (nuclear particles growth stage).

Examples of the tetraalkoxysilane include tetramethoxysilane, tetraethoxysilane, tetrapropoxysilane, and tetrabutoxysilane. From the viewpoint of controllability of reaction rate, or the shape, the particle size, the particle size distribution, and the like of the silica particles (silica composite particles) to be obtained, tetramethoxysilane and tetraethoxysilane are preferable.

The supply amount of tetraalkoxysilane is from 0.001 mol/(mol·min) to 0.01 mol/(mol·min), preferably from 0.002 mol/(mol·min) to 0.009 mol/(mol·min), and more preferably from 0.003 mol/(mol·min) to 0.008 mol/(mol·min), relative to the alcohol in the alkali catalyst solution.

This amount means that the tetraalkoxysilane is supplied in a supply amount of from 0.001 mol to 0.01 mol per one minute, relative to 1 mol of the alcohol used in a step of preparing the alkali catalyst solution.

Furthermore, the particle size of the silica composite particles depends on the type of the tetraalkoxysilane or the reaction conditions, but primary particles having a particle size of 100 nm or more may be obtained by setting the total supply amount of the tetraalkoxysilane used in the reaction of the particles formation to be 1.08 mol or more, relative to 1 L of the dispersion of the silica composite particles; and primary particles having a particle size of 500 nm or less may be obtained by setting the total supply amount to be 5.49 mol or less, relative to 1 L of the dispersion of the silica composite particles.

When the supply amount of the tetraalkoxysilane is smaller than 0.001 mol/(mol·min), the contact probability between the tetraalkoxysilane added dropwise and the nuclear particles is further reduced. In this case, however, production efficiency is low because it takes a long time to complete the dropwise addition of the total supply amount of tetraalkoxysilane.

It is considered that when the supply amount of the tetraalkoxysilane is 0.01 mol/(mol·min) or more, the reaction between the tetraalkoxysilane may be caused before the tetraalkoxysilane added dropwise and the nuclear particles start to react with each other. Thus, since uneven distribution of tetraalkoxysilane supplied to the nuclear particles may be facilitated and the variation in formation of the nuclear particles may be caused, the average particle diameter and the distribution width of the shape distribution may be increased.

On the other hand, examples of the alkali catalyst to be supplied to the alkali catalyst solution include the substances as illustrated above. The alkali catalyst to be supplied may be the same as or different from the alkali catalyst that has been previously contained in the alkali catalyst solution, but is preferably the same as the alkali catalyst.

The supply amount of the alkali catalyst is from 0.1 mol to 0.4 mol, preferably 0.14 mol to 0.35 mol, and more preferably 0.18 mol to 0.30 mol, relative to per 1 mol of a total supply amount of the tetraalkoxysilane supplied per one minute.

When the supply amount of the alkali catalyst is less than 0.1 mol, dispersibility of the formed nuclear particles in the course of growth may become unstable. As a result, coarse aggregates such as secondary aggregates may be formed, or a gel may be formed, and thus, the particle size distribution may deteriorate.

On the other hand, when the supply amount of the alkali catalyst is greater than 0.4 mol, the formed nuclear particles are excessively stabilized, and even if irregular shaped nuclear particles are formed in the nuclear particle formation stage, the nuclear particles grow into a spherical shape during the nuclear particle growth stage, so that irregular shaped silica composite particles are not obtained.

Here, in the particle forming step, while the tetraalkoxysilane and the alkali catalyst are supplied into the alkali catalyst solution, respectively, this supply method may be a method of continuously supplying the materials, or may be a method of intermittently supplying the materials.

Furthermore, in the particle forming step, the temperature of the alkali catalyst solution (temperature upon supply) is, for example, suitably in a range of from 5° C. to 50° C., preferably from 15° C. to 40° C.

Next, a surface-treatment step will be described.

The surface-treatment step is a step of supplying a mixed solution of alcohol and a titanium compound in the alkali catalyst solution in which the silica particles are formed through the steps described above, to perform a surface-treatment of the silica particles by the titanium compound.

Specifically, the surface of the silica particles is treated by the titanium compound, for example, by allowing silanol group of the surface of the silica particles and an organic group (for example, alkoxy group) of the titanium compound to react.

The titanium compound is a metal compound in which a titanium atom is bonded to an organic group through oxygen, and examples thereof include titanium compounds such as alkoxides (for example, methoxide, ethoxide, n-propoxide, i-propoxide, n-butoxide, i-butoxide, sec-butoxide, tert-butoxide, and the like) and chelates or acylates (for example, β-diketones such as acetyl acetate; β-ketoesters such as ethyl acetoacetate; amines such as triethanoleamine, carboxylic acids such as acetic acid, butyric acid, lactic acid, and citric acid; and the like).

However, the titanium compound is preferably a titanium compound having one or more (preferably two or more) alkoxy groups in terms of the controllability of the reaction rate or the shape, particle diameter, particle size distribution, and the like of the obtained silica composite particles. That is, the titanium compound is a titanium compound in which one or more (preferably two or more) alkoxy groups (alkyl groups bonded to a titanium atom through oxygen) are bonded to a titanium atom.

In addition, the number of carbon atoms in the alkoxy group is 8 or less, and preferably from 1 to 4 in terms of the controllability of the reaction rate or the shape, particle diameter, particle size distribution, and the like of the obtained silica composite particles.

Specific examples of the titanium compound include tetra-i-propoxy titanium, tetra-n-butoxy titanium, tetra-t-butoxy titanium, di-i-propoxybis(ethylacetonate) titanium, di-i-propoxybis(acetylacetonate) titanium, di-i-propoxybis(triethanolaminate) titanium, di-i-propoxy titaniumdiacetate, and di-i-propoxy titaniumdiprobionate.

On the other hand, examples of the alcohol include an alcohol having 1 to 4 carbon atoms (preferably, 2 to 4 carbon atoms), and specific examples of the alcohol include methanol, ethanol, isopropanol, and 1-butanol.

Specifically, from the viewpoint of controllability of reaction rate of the titanium compound, or the shape, the particle size, the particle size distribution, and the like of the silica composite particles to be obtained, the alcohol may be the alcohol that has a carbon number less than the number of carbon of the alkoxy group of the titanium compound (specifically, for example, the difference of carbon number is 0 to 2 (preferably, from 0 to 1)).

In addition, the alcohol may be the same as or different from the alcohol contained in the alkali catalyst solution.

In the mixed solution of a titanium compound and alcohol, the concentration of the titanium compound relative to the alcohol is from 0.1% by weight to 50% by weight, preferably from 0.1% by weight to 5% by weight.

In the supply of the mixed solution of a titanium compound and alcohol, for example, ratio of the titanium compound relative to the silica particles is preferably from 0.001% by weight to 10% by weight.

When the supply amount of the mixed solution is set as to be the range described above, the reaction rate of the titanium compound is controlled, and it becomes easier to control gelation, and the desired titanium content, the shape, the particle diameter, the particle size distribution of silica composite particles can be easily obtained.

The surface-treatment condition of the silica particles by the titanium compound is not particularly limited, and for example, the surface treatment is performed by allowing the titanium compound to react under stirring at a temperature in the range of from 5° C. to 40° C.

The silica composite particles which have been subjected to a surface-treatment by the titanium compound are obtained through the steps described above.

In this state, the silica composite particles to be obtained are obtained in the form of a dispersion, and may be used as a dispersion of the silica composite particles as it is, or as a powder of the silica composite particles extracted by removing the solvent.

When the silica composite particles are used as a dispersion of silica composite particles, the solids concentration of silica composite particles may be adjusted by diluting the dispersion with water or alcohol or by concentrating the dispersion, as necessary. Furthermore, the dispersion of silica composite particles may be used by substituting the solvent with water-soluble organic solvents such as other alcohols, esters, or ketones.

On the other hand, when the silica composite particles are used as a powder, it is necessary to remove the solvent from the dispersion of the silica composite particles. Examples of the method for removing the solvent include known methods such as 1) a method of removing the solvent by filtration, centrifugal separation, distillation, and the like, and then drying by a vacuum dryer, a tray dryer, and the like, 2) a method of directly drying a slurry by a fluidized bed dryer, a spray dryer, and the like. The drying temperature is not particularly limited, but is preferably 200° C. or lower. When the drying temperature is above 200° C., it is likely to cause bonding among the primary particles or formation of coarse particles due to the condensation of silanol groups remaining on the silica composite particle surface.

The dried silica composite particles are preferably pulverized or sieved in order to remove coarse particles or aggregates therefrom, as necessary. The method of pulverization is not particularly limited and may be carried out by a dry pulverizer, such as a jet mill, a vibration mill, a ball mill, or a pin mill. The method of sieving may be carried out by known devices, such as a vibration sieve or a wind classifier.

Next, a hydrophobization treatment step will be described.

Hydrophobization treatment step is to perform hydrophobization treatment by a hydrophobizing agent to the surface of the silica composite particles obtained through the steps described above.

Examples of the hydrophobizing agent include known organosilicon compounds having an alkyl group (for example, a methyl group, an ethyl group, a propyl group, or a butyl group). Specific examples thereof include silazane compounds (for example, silane compounds, such as methyltrimethoxysilane, dimethyldimethoxysilane, trimethylcholorosilane, or trimethylmethoxysilane, hexamethyldisilazane, and tetramethyldisilazane). The hydrophobizing agents may be used singly or in combination of two or more kinds thereof.

Among these hydrophobizing agents, organosilicon compounds having a trimethyl group, such as trimethylmethoxysilane or hexamethyldisilazane, are preferable.

The amount used of the hydrophobizing agent is not particularly limited, but in order to achieve the effect of hydrophobization, for example, the amount used is from 1% by weight to 100% by weight, and preferably from 5% by weight to 80% by weight, relative to the silica composite particles.

Examples of the method of obtaining a dispersion of hydrophobic silica composite particles which have been subjected to a hydrophobization treatment with a hydrophobizing agent include a method of obtaining a dispersion of hydrophobic silica composite particles by adding a required amount of a hydrophobizing agent to a dispersion of silica composite particles, allowing the same to react under stirring at a temperature in the range of from 30° C. to 80° C., and thereby subjecting the silica composite particles to a hydrophobization treatment. When this reaction temperature is lower than 30° C., it may be difficult for the hydrophobization reaction to proceed, and at a temperature exceeding 80° C., gelation of the dispersion due to the self-condensation of the hydrophobizing agent, or aggregation of the silica composite particles may be likely to occur.

On the other hand, examples of the method of obtaining a powder of hydrophobic silica composite particles include a method of obtaining a powder of hydrophobic silica composite particles by obtaining a dispersion of hydrophobic silica composite particles by the method as described above, and then drying the same by the method as described above; a method of obtaining a powder of hydrophobic silica composite particles by drying a dispersion of silica composite particles to obtain a powder of the hydrophilic silica composite particles, and then adding a hydrophobizing agent thereto to perform a hydrophobization treatment; and a method of obtaining a powder of hydrophobic silica composite particles by obtaining a dispersion of hydrophobic silica composite particles, and then drying the same to obtain a powder of the hydrophobic silica composite particles, and further adding a hydrophobizing agent thereto to perform a hydrophobization treatment.

Here, the examples of the method for hydrophobizing a powder of silica composite particles include a method which includes stirring a powder of hydrophilic silica composite particles in a treatment bath, such as a Henschel mixer, or a fluidized bed, adding the hydrophobizing agent thereto, and heating the treatment bath to gasify the hydrophobizing agent so as to react with silanol groups on the surface of the powder of silica composite particles. The treatment temperature is not particularly limited, but is, for example, preferably from 80° C. to 300° C., and more preferably from 120° C. to 200° C.

The silica composite particles according to the exemplary embodiment as described above may be applied in a variety of fields such as toners, cosmetics, or abrasives.

EXAMPLES

Hereinafter, the present invention will be more specifically described with reference to the Examples. However, these Examples are not intended to limit the scope of the invention. Unless otherwise specified, "parts" and "%" are on the weight basis.

Example 1

Alkali Catalyst Solution Preparing Step [Preparation of Alkali Catalyst Solution]

400 parts of methanol and 70 parts of 10% ammonia water ($NH_4OH$) are placed in a 2.5 L glass reaction vessel equipped with a stirrer, a dropping nozzle and a thermometer, and mixed under stirring to obtain an alkali catalyst solution. At this time, the amount of ammonia catalyst: the amount of NH$_3$ (NH$_3$[mol]/(NH$_3$+methanol+water) [L]) in the alkali catalyst solution is 0.71 mol/L.

Particles Forming Step (Preparation of Suspension of Silica Particles)

Subsequently, the temperature of the alkali catalyst solution is adjusted to 25° C., and the alkali catalyst solution is substituted with nitrogen. Thereafter, while stirring the alkali catalyst solution at 120 rpm, 200 parts of tetramethoxysilane (TMOS) and 158 parts of ammonia water (NH$_4$OH) containing a catalyst (NH$_3$) at a concentration of 3.8% are started to be added dropwise to the alkali catalyst solution at the same time over 60 minutes in the following supply amounts, to obtain a suspension of silica particles (a silica particles suspension).

At this time, the supply amount of the tetramethoxysilane is adjusted to be 0.0018 mol/(mol·min), relative to the total number of moles of methanol in the alkali catalyst solution.

In addition, the supply amount of 3.8% ammonia water is adjusted to be 0.27 mol/min, relative to 1 mol of a total supply amount of the tetraalkoxysilane supplied per one minute.

Surface-Treatment Step of Silica Composite Particles

An alcohol diluted solution in which tetrabutyl orthotitanate (tetra-n-butoxy titanium) is diluted to be 1.0% by weight with butanol is prepared.

The surface-treatment is performed by adding the alcohol diluted solution to the solution in which silica particles are formed, and the mixture is allow to react to the surface of the silica particles, thereby obtaining silica composite particles. In addition, the addition of the alcohol diluted solution is carried out such that the amount of tetrabutyl orthotitanate as a titanium compound is adjusted to be 1.75 parts, relative to 100 parts of silica particles.

Thereafter, 500 parts of the solvent of the obtained silica composite particles suspension is distilled off by heating and distillation, 500 parts of pure water is added to the residue, and then the solution thus obtained is dried by a freeze dryer to obtain irregular shaped hydrophilic silica composite particles.

Hydrophobization Treatment of Silica Composite Particles

Furthermore, 7 parts of hexamethyldisilazane is added to 35 parts of the hydrophilic silica composite particles, and the mixture is allowed to react for 2 hours at 150° C., thereby obtaining irregular shaped hydrophobic silica composite particles having a hydrophobized particle surface.

Examples 2 to 12, and Comparative Examples 1 to 8

Irregularly shaped hydrophobic silica composite particles are obtained in the same manner as Example 1, except that various conditions in the alkali catalyst solution preparing step, the particle forming step, and the surface-treatment step of silica particle are changed as indicated in Tables 1 and 2.

However, in Example 9, as the titanium compound, titanium diisopropoxy bis(acetylacetonate) is used instead of tetrabutyl orthotitanate.

In addition, in Example 10, as the titanium compound, titanium isopropoxy bis(ethylacetoacetate) is used instead of tetrabutoxytitanium.

Furthermore, in Tables 1 and 2, "Supply amount of TMOS" is a supply amount of TMOS relative to number of moles of alcohol in an alkali catalyst solution.

In addition, "Supply amount of NH$_3$" represents number of moles relative to per 1 mol of a total supply amount of a metal compound supplied per one minute.

In addition, "Supply amount of alcohol diluted solution" represents number of parts (number of parts relative to 100 parts of silica particles) of a titanium compound supplied by adding an alcohol diluted solution.

In Tables 1 and 2, the abbreviations are as follows.
TBT=tetrabutyl orthotitanate (tetra-n-butoxytitanium)
BuOH=Butanol Evaluation
Properties of Silica Composite Particles For the hydrophobic silica composite particles obtained from each Example, the content of titanium in the surface portion of the silica composite particles, the average particle diameter, particle size distribution, and the average degree of circularity are investigated according to the methods previously described.

Furthermore, for the hydrophobic silica composite particles obtained from Examples 1 to 12, a titanium content is quantified by the NET strength of constitutional elements in the particles, using a fluorescence X-ray analyzer: XRF 1500 (manufactured by Shimadzu Corporation), and then mapping is performed with an SEM-EDX (manufactured by Hitachi Ltd., S-3400N). As a result of the investigation, it is confirmed that titanium is unevenly distributed on the surface of silica composite particles.

Dispersibility

In a case where the hydrophobic silica composite particles obtained from each Example are dispersed in the resin particle, the dispersibility of the hydrophobic silica composite particles in resin particles is evaluated.

Specifically, 0.01 g of hydrophobic silica composite particles are added to 6 g of resin particles having a particle size of 50 μm, the resultant mixture is left to stand under an environment of a high temperature and a high humidity (under an environment of a temperature of 10° C. and a humidity of 15% RH) for 17 hours, and the same is mixed by shaking with a shaking apparatus for 5 minutes immediately after the mixture is moved to stand under an environment of a low temperature and a low humidity (under an environment of a temperature of 10° C. and a humidity of 15% RH), and then the surface of the resin particles is observed with an SEM apparatus, and evaluated in accordance with the following evaluation criteria (evaluation of dispersibility immediately after environmental fluctuation).

Similarly, the mixture is moved to stand under an environment of a low temperature and a low humidity (under an environment of a temperature of 10° C. and a humidity of 15% RH), for 17 hours, and then the surface of the resin particles is also observed with an SEM apparatus, and evaluated in accordance with the following evaluation criteria in the same way (evaluation of dispersibility after elapsed time of environmental fluctuation).

Evaluation Criteria (Dispersibility)

A: silica composite particles are uniformly dispersed on the surface of resin particles.

B: A slight degree of aggregates of silica composite particles are observed, but the coverage (coverage amount) onto the surface of resin particles is not lowered. Acceptable for practical applications.

C: Aggregates of silica composite particles are partially observed, and the coverage (coverage amount) onto the surface of resin particles is clearly lowered. Poor Dispersion.

Fluidity Maintenance

In a case where the hydrophobic silica composite particles obtained from each Example are dispersed in the resin particles, the maintenance of fluidity of the resin particle is evaluated.

Specifically, 0.1 g of hydrophobic silica composite particles are added to 2 g of resin particles having a particle size of 10 μm, the resultant mixture is left to stand under an environment of a high temperature and a high humidity (under an environment of a temperature of 10° C. and a humidity of 15% RH) for 17 hours, and the same is mixed by shaking with a shaking apparatus for 25 minutes immediately after the mixture is moved to stand under an environment of a low temperature and a low humidity (under an environment of a temperature of 10° C. and a humidity of 15% RH). Thereafter, the resin particles are placed on a 75 μm sieve and vibrated at a vibration width of 1 mm for 90 seconds, and the state of the resin particles falling down is observed and evaluated in accordance with the following evaluation criteria (evaluation of fluidity maintenance immediately after environmental fluctuation).

Similarly, the mixture is moved to stand under an environment of a low temperature and a low humidity (under an environment of a temperature of 10° C. and a humidity of 15% RH), for 17 hours, the state of the resin particles falling down is also observed and evaluated in accordance with the following evaluation criteria in the same way (evaluation of fluidity maintenance after elapsed time of environmental fluctuation).

Evaluation Criteria (Fluidity)

A: Resin particles do not remain on the sieve.

B: A slight amount of resin particles remain on the sieve.

C: A significant amount of resin particles remain on the sieve.

The details and evaluation results of the respective Examples are listed in Tables 3 and 4.

TABLE 1

| | Alkali catalyst solution preparing step (alkali catalyst solution composition) | | | Particle forming step (TMOS and ammonia water supply conditions) | | | |
|---|---|---|---|---|---|---|---|
| | Methanol Number of parts | Ammonia water Number of parts | $NH_3$ amount mol/L | Total supply amount of TMOS Number of parts | Supply amount of TMOS mol/mol · min | Total supply amount of ammonia water Number of parts | Supply amount of $NH_3$ mol |
| Example 1 | 400 | 70 | 0.71 | 200 | 0.0018 | 158 | 0.27 |
| Example 2 | 400 | 60 | 0.62 | 30 | 0.0011 | 24 | 0.27 |
| Example 3 | 400 | 58 | 0.60 | 200 | 0.0018 | 158 | 0.27 |
| Example 4 | 400 | 85 | 0.83 | 200 | 0.0018 | 158 | 0.27 |
| Example 5 | 400 | 70 | 0.71 | 200 | 0.0018 | 158 | 0.27 |
| Example 6 | 400 | 70 | 0.71 | 200 | 0.0018 | 158 | 0.27 |
| Example 7 | 400 | 70 | 0.71 | 135 | 0.0012 | 107 | 0.27 |
| Example 8 | 400 | 70 | 0.71 | 1100 | 0.0096 | 869 | 0.27 |
| Example 9 | 400 | 70 | 0.71 | 200 | 0.0018 | 158 | 0.27 |
| Example 10 | 400 | 70 | 0.71 | 200 | 0.0018 | 158 | 0.27 |
| Example 11 | 400 | 70 | 0.71 | 200 | 0.0018 | 158 | 0.27 |
| Example 12 | 400 | 70 | 0.71 | 200 | 0.0018 | 158 | 0.27 |

| | Surface-treatment Step (Supply conditions and composition of alcohol diluted solution) | | | |
|---|---|---|---|---|
| | Composition of alcohol diluted solution/ Titanium compound concentration | Supply amount of alcohol diluted solution (relative to silica particles) Number of parts | Ti content in particles Fluorescence X-ray measurement % by weight | Ti content in particle surface XPS measurement atom % |
| Example 1 | TBT + BuOH/1.0% by weight | 1.75 | 1.73 | 2.61 |
| Example 2 | TBT + BuOH/1.0% by weight | 1.75 | 1.75 | 2.25 |
| Example 3 | TBT + BuOH/1.0% by weight | 1.75 | 1.57 | 1.83 |
| Example 4 | TBT + BuOH/1.0% by weight | 0.88 | 0.75 | 0.81 |
| Example 5 | TBT + BuOH/1.0% by weight | 1.75 | 1.74 | 2.20 |
| Example 6 | TBT + BuOH/1.0% by weight | 1.75 | 1.73 | 2.10 |
| Example 7 | TBT + BuOH/1.0% by weight | 1.75 | 1.75 | 2.15 |
| Example 8 | TBT + BuOH/1.0% by weight | 1.75 | 1.65 | 2.48 |
| Example 9 | titanium diisopropoxy bis (acetylacetonate) + BuOH/1.0% by weight | 1.75 | 1.70 | 2.75 |
| Example 10 | titanium diisopropoxy bis (ethylacetoacetate) + BuOH/1.0% by weight | 1.75 | 1.72 | 2.73 |
| Example 11 | TBT + BuOH/1.0% by weight | 0.10 | 0.10 | 0.17 |
| Example 12 | TBT + BuOH/1.0% by weight | 5.00 | 9.50 | 5.86 |

TABLE 2

| | Alkali catalyst solution preparing step (alkali catalyst solution composition) | | | Particle forming step (TMOS and ammonia water supply conditions) | | | |
|---|---|---|---|---|---|---|---|
| | Methanol Number of parts | Ammonia water Number of parts | NH₃ amount mol/L | Total supply amount of TMOS Number of parts | Supply amount of TMOS mol/mol · min | Total supply amount of ammonia water Number of parts | Supply amount of NH₃ mol |
| Comparative Example 1 | 400 | 70 | 0.71 | 200 | 0.0018 | 158 | 0.27 |
| Comparative Example 2 | 400 | 60 | 0.62 | 72 | 0.0006 | 57 | 0.27 |
| Comparative Example 3 | 400 | 60 | 0.62 | 910 | 0.0080 | 719 | 0.27 |
| Comparative Example 4 | 400 | 60 | 0.58 | 200 | 0.0018 | 158 | 0.20 |
| Comparative Example 5 | 400 | 50 | 0.58 | 200 | 0.0018 | 158 | 0.09 |
| Comparative Example 6 | 400 | 90 | 0.88 | 200 | 0.0018 | 158 | 0.41 |
| Comparative Example 7 | 400 | 70 | 0.71 | 200 | 0.0018 | 158 | 0.27 |
| Comparative Example 8 | 400 | 70 | 0.71 | 200 | 0.0018 | 158 | 0.27 |

| | Surface-treatment Step (Supply conditions and composition of alcohol diluted solution) | | | |
|---|---|---|---|---|
| | Composition of alcohol diluted solution/Titanium compound concentration | Supply amount of alcohol diluted solution (relative to silica particles) Number of parts | Ti content in particles Fluorescence X-ray measurement % by weight | Ti content in particle surface XPS measurement atom % |
| Comparative Example 1 | None | 0.00 | 0.00 | 0.00 |
| Comparative Example 2 | TBT + BuOH/1.0% by weight | 1.75 | — | — |
| Comparative Example 3 | TBT + BuOH/1.0% by weight | 1.75 | 1.70 | 2.18 |
| Comparative Example 4 | TBT + BuOH/1.0% by weight | 1.75 | 1.57 | 1.99 |
| Comparative Example 5 | TBT + BuOH/1.0% by weight | 1.75 | — | — |
| Comparative Example 6 | TBT + BuOH/1.0% by weight | 1.75 | 1.74 | 0.46 |
| Comparative Example 7 | TBT + BuOH/1.0% by weight | 5.20 | — | — |
| Comparative Example 8 | TBT | 1.75 | — | — |

TABLE 3

| | Properties of silica composite particles | | | | | Evaluation | | | |
|---|---|---|---|---|---|---|---|---|---|
| | | | | | | Dispersibility | | Fluidity maintenance | |
| | Ti content in particles Fluorescence X-ray measurement (% by weight) | Ti content in particle surface XPS measurement (atom %) | Average particle diameter D50v (nm) | Particle size of circularity (—) | Average degree distribution (—) | Immediately after environmental fluctuation | After elapsed time of environmental fluctuation | Immediately after environmental fluctuation | After elapsed time of environmental fluctuation |
| Example 1 | 1.73 | 2.61 | 158 | 1.34 | 0.72 | A | A | A | A |
| Example 2 | 1.75 | 2.25 | 36 | 1.25 | 0.8 | B | B | A | A |
| Example 3 | 1.57 | 1.83 | 156 | 1.39 | 0.62 | A | A | A | A |
| Example 4 | 0.75 | 0.81 | 163 | 1.29 | 0.85 | A | A | A | A |
| Example 5 | 1.74 | 2.20 | 158 | 1.35 | 0.7 | A | A | B | B |
| Example 6 | 1.73 | 2.10 | 157 | 1.31 | 0.81 | A | A | A | A |

TABLE 3-continued

| | Properties of silica composite particles | | | | | Evaluation | | | |
| --- | --- | --- | --- | --- | --- | --- | --- | --- | --- |
| | Ti content in particles | Ti content in | | | | Dispersibility | | Fluidity maintenance | |
| | Fluorescence X-ray measurement (% by weight) | particle surface XPS measurement (atom %) | Average particle diameter D50v (nm) | Particle size of circularity (—) | Average degree distribution (—) | Immediately after environmental fluctuation | After elapsed time of environmental fluctuation | Immediately after environmental fluctuation | After elapsed time of environmental fluctuation |
| Example 7 | 1.75 | 2.15 | 161 | 1.32 | 0.78 | A | A | A | A |
| Example 8 | 1.65 | 2.48 | 499 | 1.28 | 0.62 | A | A | B | B |
| Example 9 | 1.70 | 2.75 | 155 | 1.28 | 0.62 | A | A | A | A |
| Example 10 | 1.72 | 2.73 | 152 | 1.29 | 0.85 | A | A | A | A |
| Example 11 | 0.10 | 0.17 | 158 | 1.35 | 0.7 | A | A | A | B |
| Example 12 | 9.50 | 5.86 | 160 | 1.31 | 0.81 | B | B | A | A |

TABLE 4

| | Properties of silica composite particles | | | | | Evaluation | | | |
| --- | --- | --- | --- | --- | --- | --- | --- | --- | --- |
| | Ti content in particles | Ti content in | | | | Dispersibility | | Fluidity maintenance | |
| | Fluorescence X-ray measurement (% by weight) | particle surface XPS measurement (atom %) | Average particle diameter D50v (nm) | Particle size distribution (—) | Average degree of circularity (—) | Immediately after environmental fluctuation | After elapsed time of environmental fluctuation | Immediately after environmental fluctuation | After elapsed time of environmental fluctuation |
| Comparative Example 1 | 0.00 | 0.00 | 158 | 1.34 | 0.72 | B | B | B | C |
| Comparative Example 2 | — | — | — | — | — | Evaluation unavailable | Evaluation unavailable | Evaluation unavailable | Evaluation unavailable |
| Comparative Example 3 | 1.70 | 2.18 | 550 | 1.21 | 0.82 | C | C | B | B |
| Comparative Example 4 | 1.57 | 1.99 | 135 | 1.55 | 0.53 | C | C | B | B |
| Comparative Example 5 | — | — | — | — | — | Evaluation unavailable | Evaluation unavailable | Evaluation unavailable | Evaluation unavailable |
| Comparative Example 6 | 1.74 | 0.46 | 162 | 1.12 | 0.92 | A | C | C | C |
| Comparative Example 7 | — | — | — | — | — | Evaluation unavailable | Evaluation unavailable | Evaluation unavailable | Evaluation unavailable |
| Comparative Example 8 | — | — | — | — | — | Evaluation unavailable | Evaluation unavailable | Evaluation unavailable | Evaluation unavailable |

From the above results, it is seen that the present Examples exhibit lower environmental dependency in dispersibility and maintenance of fluidity as compared with the Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Silica composite particles in which a silica particle surface is sequentially surface-treated with a titanium compound in which an organic group is bonded to a titanium atom through an oxygen atom, and a hydrophobizing agent, wherein:
the silica composite paticles comprise a center portion and a surface layer;
a titanium content in the silica composite particles measured using fluorescence X-ray is from 0.001% by weight to 10% by weight;
a titanium content of the surface layer of the silica composite particles is larger than a titanium content of the center portion of the silica composite particles and satisfies the following Formula (1):

$$0.6 < Y/X < 1.8 \tag{1}$$

wherein in Formula (1), X represents a titanium content (% by weight) in silica composite particles measured using fluorescence X-ray, and Y represents a titanium content (atom %) of the silica composite particle surface layer obtained by XPS measurement;

an average particle diameter of the silica composite particles is from 30 nm to 500 nm; and a particle size distribution index of the silica composite particles is from 1.1 to 1.35, the particle size distribution index being a square root of the value obtained by dividing an 84% diameter by a 16% diameter using a cumulative frequency distribution of a circle-equivalent diameter.

2. The silica composite particles according to claim 1, wherein an average degree of circularity of the silica composite particles is from 0.5 to 0.85.

3. The silica composite particles according to claim 1, wherein the organic group is an alkoxy group.

4. The silica composite particles according to claim 3, wherein the number of carbon atoms in the alkoxy group is 8 or less.

5. The silica composite particles according to claim 1, wherein the titanium compound in which an organic group is bonded to a titanium atom through an oxygen atom is any of tetrabutyl orthotitanate, titanium diisopropoxy bis(acetylacetonate) and titanium isopropoxy bis(ethylacetoacetate).

6. The silica composite particles according to claim 1, wherein the hydrophobizing agent is an organosilicon compound having an alkyl group.

7. The silica composite particles according to claim 1, wherein the hydrophobizing agent is hexamethyldisilazane.

8. The silica composite particles according to claim 1, wherein the titanium compound is titanium diisopropoxy bis(acetylacetonate) or titanium isopropoxy bis(ethylacetoacetate).

9. Silica composite particles in which a silica particle surface is sequentially surface-treated with a titanium compound in which an organic group is bonded to a titanium atom through an oxygen atom, and a hydrophobizing agent, wherein;

the silica composite particles comprise a center portion and a surface layer;

a titanium content in the silica composite particles measured using fluorescence X-ray is from 0.1% by weight to 3% by weight;

a titanium content of the surface layer of the silica composite particles is larger than a titanium content of the center portion of the silica composite particles and satisfies the following Formula (1):

$$0.6 < Y/X < 1.8 \quad (1)$$

wherein in Formula (1), X represents a titanium content (% by weight) in silica composite particles measured using fluorescence X-ray, and Y represents a titanium content (atom %) of the silica composite particle surface layer obtained by XPS measurement;

an average particle diameter of the silica composite particles is from 100 nm to 250 nm; and a particle size distribution index of the silica composite particles is from 1.25 to 1.35, the particle size distribution index being a square root of the value obtained by dividing an 84% diameter by a 16% diameter using a cumulative frequency distribution of a circle-equivalent diameter.

10. The silica composite particles according to claim 9, wherein an average degree of circularity of the silica composite particles is from 0.6 to 0.8.

11. The silica composite particles according to claim 9, wherein the organic group is an alkoxy group.

12. The silica composite particles according to claim 11, wherein the number of carbon atoms in the alkoxy group is 8 or less.

13. The silica composite particles according to claim 9, wherein the titanium compound in which an organic group is bonded to a titanium atom through an oxygen atom is any of tetrabutyl orthotitanate, titanium diisopropoxy bis(acetylacetonate) and titanium isopropoxy bis(ethylacetoacetate).

14. The silica composite particles according to claim 9, wherein the hydrophobizing agent is an organosilicon compound having an alkyl group.

15. The silica composite particles according to claim 9, wherein the hydrophobizing agent is hexamethyldisilazane.

16. The silica composite particles according to claim 9, wherein the titanium compound is titanium diisopropoxy bis(acetylacetonate) or titanium isopropoxy bis(ethylacetoacetate).

17. A method of preparing the silica composite particles of claim 1, the method comprising:

preparing an alkali catalyst solution in which a first alkali catalyst is contained in a solvent containing alcohol;

supplying a tetraalkoxysilane and a second alkali catalyst into the alkali catalyst solution to form silica particles, the second alkali catalyst being the same as or different from the first alkali catalyst;

adding a mixed solution of alcohol and the titanium compound, in the alkali catalyst solution in which the silica particles are formed, to perform a surface-treatment of the surface of the silica particles by the titanium compound; and performing a surface-treatment of the surface of the silica particles treated by the titanium compound, with the hydrophobizing agent.

18. A method of preparing the silica composite particles of claim 1, the method comprising:

preparing an alkali catalyst solution containing first alkali catalyst at a concentration of from 0.6 mol/L to 0.85 mol/L, in a solvent containing alcohol;

supplying, into the alkali catalyst solution, tetraalkoxysilane at a supply amount of from 0.001 mol/(mol·min) to 0.01 mol/(mol·min) relative to the alcohol, a second alkali catalyst at a supply amount of from 0.1 mol to 0.4 mol, relative to per 1 mol of a total supply amount of the tetraalkoxysilane per one minute, to form silica particles, wherein the second alkali catalyst is the same as or different from the first alkali catalyst;

supplying a mixed solution of alcohol and the titanium compound, in the alkali catalyst solution in which the silica particles are formed, to perform a surface-treatment of the surface of the silica particles by the titanium compound; and performing a surface-treatment of the surface of the silica particles treated by the titanium compound, with the hydrophobizing agent.

19. A method of preparing the silica composite particles of claim 9, the method comprising:

preparing an alkali catalyst solution in which a first alkali catalyst is contained in a solvent containing alcohol;

supplying a tetraalkoxysilane and a second alkali catalyst into the alkali catalyst solution to form silica particles, the second alkali catalyst being the same as or different from the first alkali catalyst;

adding a mixed solution of alcohol and the titanium compound, in the alkali catalyst solution in which the silica particles are formed, to perform a surface-treatment of the surface of the silica particles by the titanium compound; and performing a surface-treatment of the surface of the silica particles treated by the titanium compound, with the hydrophobizing agent.

20. A method of preparing the silica composite particles of claim 9, the method comprising:
   preparing an alkali catalyst solution containing a first alkali catalyst at a concentration of from 0.6 mol/L to 0.85 mol/L, in a solvent containing alcohol;
   supplying, into the alkali catalyst solution, tetraalkoxysilane at a supply amount of from 0.001 mol/(mol·min) to 0.01 mol/(mol·min) relative to the alcohol, a second alkali catalyst at a supply amount of from 0.1 mol to 0.4 mol, relative to per 1 mol of a total supply amount of the tetraalkoxysilane per one minute, to form silica particles, wherein the second alkali catalyst is the same as or different from the first alkali catalyst;
   supplying a mixed solution of alcohol and the titanium compound, in the alkali catalyst solution in which the silica particles are formed, to perform a surface-treatment of the surface of the silica particles by the titanium compound; and
   performing a surface-treatment of the surface of the silica particles treated by the titanium compound, with the hydrophobizing agent.

\* \* \* \* \*